(12) United States Patent
Panahi (10) Patent No.: US 6,264,832 B1
(45) Date of Patent: Jul. 24, 2001

(54) APPARATUS FOR THE TREATMENT OF RAIN WATER

(76) Inventor: Fazlollah Panahi, 4603 Connaught Drive, Vancouver British Colunbia (CA), V6J 4E3

( * ) Notice: Subject to any disclaimer, the term of this patent is extended or adjusted under 35 U.S.C. 154(b) by 0 days.

(21) Appl. No.: 09/486,013
(22) PCT Filed: Jul. 7, 1998
(86) PCT No.: PCT/CA98/00656
§ 371 Date: May 4, 2000
§ 102(e) Date: May 4, 2000
(87) PCT Pub. No.: WO99/09263
PCT Pub. Date: Feb. 25, 1999

(30) Foreign Application Priority Data

Aug. 19, 1997 (CA) .................................................. 2211935

(51) Int. Cl.[7] ................................................... B01D 35/00
(52) U.S. Cl. ...................... 210/127; 210/123; 210/104; 210/128; 210/202; 210/205; 210/257.1; 210/256; 210/262; 210/335; 210/533
(58) Field of Search ............................... 210/97, 98, 104, 210/105, 121, 123, 127, 128, 200, 202, 203, 205, 257.1, 252, 255, 256, 261, 262, 335, 532.1, 533

(56) References Cited

U.S. PATENT DOCUMENTS

| | | |
|---|---|---|
| Re. 30,793 | 11/1981 | Dunkers . |
| 3,730,120 | 5/1973 | Dobell . |
| 3,962,084 | 6/1976 | Nussbaum . |
| 4,144,170 | 3/1979 | Dunkers . |
| 4,149,970 | 4/1979 | Atkins et al. . |
| 4,317,733 | 3/1982 | Xhonneux . |
| 5,301,474 | 4/1994 | Carey, II et al. . |
| 5,351,847 | 10/1994 | Greenbaum . |
| 5,396,745 | 3/1995 | Klein . |
| 5,536,403 | 7/1996 | Sugimoto . |
| 5,611,926 | 3/1997 | Nishida . |
| 5,980,736 | * 11/1999 | Putz et al. . |

FOREIGN PATENT DOCUMENTS

| | | |
|---|---|---|
| 4409124 | 9/1995 | (DE) . |
| 296 13 280 U | 9/1996 | (DE) . |
| 11080 | 12/1909 | (FR) . |
| 178092A | 3/1922 | (GB) . |
| 2099319 | 12/1982 | (GB) . |

* cited by examiner

Primary Examiner—Joseph W. Drodge
Assistant Examiner—Terry K. Cecil
(74) Attorney, Agent, or Firm—Merchant & Gould P.C.

(57) ABSTRACT

An apparatus (18) for receiving rain water from a water collecting means (20) and treating this water according to a treatment cycle. The apparatus has a stop tank (24) to hold incoming water while a treatment cycle is being executed in a main tank (32), so there is no mixing of the treated water with water to be treated. The main tank has various reservoirs (42, 52, 62), valves (30, 40, 50) and buoyant elements (68, 70), and the water flow is strictly controlled by gravity and the buoyancy of the water. Treating solutions such as a mineral solution and a chloride solution are added in predetermined quantities to the water during the treatment cycle, and the treated water is stored into a storage tank (22).

14 Claims, 11 Drawing Sheets

| Nb of persons to supply | Rate 100% | 75% | Water Needs | ANNUAL RAINFALL IN MILLIMETERS (mm) | | | | | | | | |
|---|---|---|---|---|---|---|---|---|---|---|---|---|
| | | | | 400 | 600 | 800 | 1000 | 1200 | 1400 | 1600 | 1800 | 2000 |
| | | | | 300 | 450 | 600 | 750 | 900 | 1050 | 1200 | 1350 | 1500 |
| | | | | m² | m² | m² | m² | m² | m² | m² | m² | m² |
| 1 | | | 1500 | 5.0 | 3.3 | 2.5 | 2.0 | 1.7 | 1.4 | 1.3 | 1.1 | 1.0 |
| 2 | | | 3000 | 10.0 | 6.7 | 5.0 | 4.0 | 3.3 | 2.9 | 2.5 | 2.2 | 2.0 |
| 3 | | | 4500 | 15.0 | 10.0 | 7.5 | 6.0 | 5.0 | 4.3 | 3.8 | 3.3 | 3.0 |
| 4 | | | 6000 | 20.0 | 13.3 | 10.0 | 8.0 | 6.7 | 5.7 | 5.0 | 4.4 | 4.0 |
| 5 | | | 7500 | 25.0 | 16.7 | 12.5 | 10.0 | 8.3 | 7.1 | 6.3 | 5.6 | 5.0 |
| 6 | | | 9000 | 30.0 | 20.0 | 15.0 | 12.0 | 10.0 | 8.6 | 7.5 | 6.7 | 6.0 |
| 7 | | | 10500 | 35.0 | 23.3 | 17.5 | 14.0 | 11.7 | 10.0 | 8.8 | 7.8 | 7.0 |
| 8 | | | 12000 | 40.0 | 26.7 | 20.0 | 16.0 | 13.3 | 11.4 | 10.0 | 8.99 | 8.0 |
| 9 | | | 13500 | 45.0 | 30.0 | 22.5 | 18.0 | 15.0 | 12.9 | 11.3 | 10.0 | 9.0 |
| 10 | | | 15000 | 50.0 | 33.3 | 25.0 | 20.0 | 16.7 | 14.3 | 12.5 | 11.1 | 10.0 |
| 11 | | | 16500 | 55.0 | 36.7 | 27.5 | 22.0 | 18.3 | 15.7 | 13.8 | 12.2 | 11.0 |
| 12 | | | 18000 | 60.0 | 40.0 | 30.0 | 24.0 | 20.0 | 17.1 | 15.0 | 13.3 | 12.0 |

APPARATUS FOR THE TREATMENT OF RAIN WATER

BACKGROUND OF THE INVENTION a) Field of the Invention

The present invention belongs to the field of water treatment, and more particularly concerns an apparatus for receiving rain water from a water collecting means and treating this water according to a treatment cycle.

b) Brief Description of Prior Art

Rain water is an inexhaustible source of drinking water. However, when it reaches the ground, it becomes contaminated by a large quantity of polluting agents. It therefore becomes necessary to treat this water with a multitude of techniques and apparatus, using a variety of chemical substances to eliminate each of the polluting agents present. It can thus be highly advantageous to collect rain water directly as it falls down, since at this stage it requires only basic treatments such as the addition of disinfecting and mineralising solutions.

An apparatus to treat rain water is disclosed in the U.S. Pat. No. 4,317,733 (XHONNEUX). This patent concerns an apparatus to make water drinkable, especially rain water. The apparatus is easy to set up, for example on a house roof, and is operable without necessitating special technical skills. It operates completely mechanically, and does not require any external source of power, electrical or otherwise. On the other hand, in this patent, the mixing of the non-treated water with the sterilizing products is controlled through a complex relationship by the water flow rate and the size of the water compartments, making the efficiency of the apparatus dependent on the precise adjustment of its various components. There is therefore a need for a simpler mechanical apparatus to collect and treat rain water.

OBJECT AND SUMMARY OF THE INVENTION

An object of the present invention is to provide an apparatus for the treatment of rain water which does not require an external source of power, such as electrical power.

Another object of the present invention is to provide such an apparatus which allows to keep the treated water apart from the water to be treated all through the treatment cycle.

A further object of the invention is to provide such an apparatus which is easy to install and requires little maintenance.

In accordance with the invention, these objects are achieved with an apparatus for receiving rain water from a water collecting means, treating said rain water according to a treatment cycle and supplying treated water into a storage tank, the apparatus comprising:

a stop tank located underneath the water collecting means, having an inlet for receiving water coming from the water collecting means, and a bottom outlet controlled by an outlet valve;

a main tank located underneath the stop tank, having an inlet for receiving water from the bottom outlet of the stop tank, an upper outlet located in an upper portion of the main tank, and a bottom outlet controlled by an outlet valve for emptying the main tank into the storage tank;

an upper reservoir having an inlet for receiving water from the upper outlet of the main tank, an upper outlet located in an upper portion of the upper reservoir, and a bottom outlet controlled by an outlet valve for emptying the upper reservoir;

a lower reservoir located underneath the upper reservoir, having a first inlet for receiving water from the upper outlet of the upper reservoir, a second inlet for receiving water from the bottom outlet of the upper reservoir, and a bottom outlet for emptying the lower reservoir into a lower portion of the main tank;

at least one solution reservoir for containing a water treating solution, having an outlet valve for supplying a predetermined amount of water treating solution into the main tank, said outlet valve of the solution reservoir being momentarily open during the treatment cycle to supply the predetermined amount of water treating solution into the main tank;

a first buoyant element located in the lower portion of the main tank for controlling the bottom outlet of the lower reservoir, the first buoyant element being movable along a vertical course between lower and higher positions within the main tank depending upon a volume of water therein, the first buoyant element blocking the bottom outlet of the lower reservoir when said first buoyant element is in its upper position; and a second buoyant element located in the lower reservoir and movable along a vertical course between lower and higher positions within the lower reservoir depending upon a volume of water therein, the second buoyant element being for controlling respectively the outlet valves of the main tank, the upper reservoir, the stop tank and the solution reservoir; at the beginning of the treatment cycle, the first buoyant element is in its lower position to set the outlet valve of the lower reservoir in an open position and the second buoyant element is also in its lower position to set the outlet valves of the main tank, the upper reservoir and the solution reservoir in closed positions and set the outlet valve of the stop tank in open position thus allowing water to flow:

first, from the stop tank into the main tank so that the first buoyant element moves to its upper position to close the bottom outlet of the lower reservoir, second, from the upper outlet of the main tank into the upper reservoir, and third, from the upper outlet of the upper reservoir into the lower reservoir so that the second buoyant element:

first, starts an upward movement toward its higher position to open the outlet valve of the main tank thus allowing flow of water from the main tank into the storage tank, to open the outlet valve of the upper reservoir thus allowing a complete filling of the lower reservoir, and to close the outlet valve of the stop tank thus stopping flow of water from the stop tank into the main tank, and second, reaches its higher position as the lower reservoir is completely filled;

as water flows from the main tank into the storage tank and water level in the main tank reaches a certain level, the first buoyant element moves downwardly toward its lower position to open the bottom outlet of the lower reservoir thus allowing flow of water from the lower reservoir into the main tank so that the second buoyant element starts a downward movement toward its lower position, a new treatment cycle beginning when the second buoyant element reaches its lower position.

The objects, advantages and other features of the present invention will become more apparent upon reading of the following non restrictive description of preferred embodiments thereof, given with the purpose of exemplification only with reference to the accompanying drawings.

DETAILED DESCRIPTION OF PREFERRED EMBODIMENTS

In the following description of the drawings, the same reference numerals refer to the same structural elements.

Referring now to FIGS. 1, 2, 3, 4, 5 and 6, there is shown a first embodiment of an apparatus (18) according to the present invention. The apparatus (18) treats water received from a water collecting means (20). The incoming water is processed according to a treatment cycle, and the resulting treated water is supplied into a storage tank (22).

Figure 1:
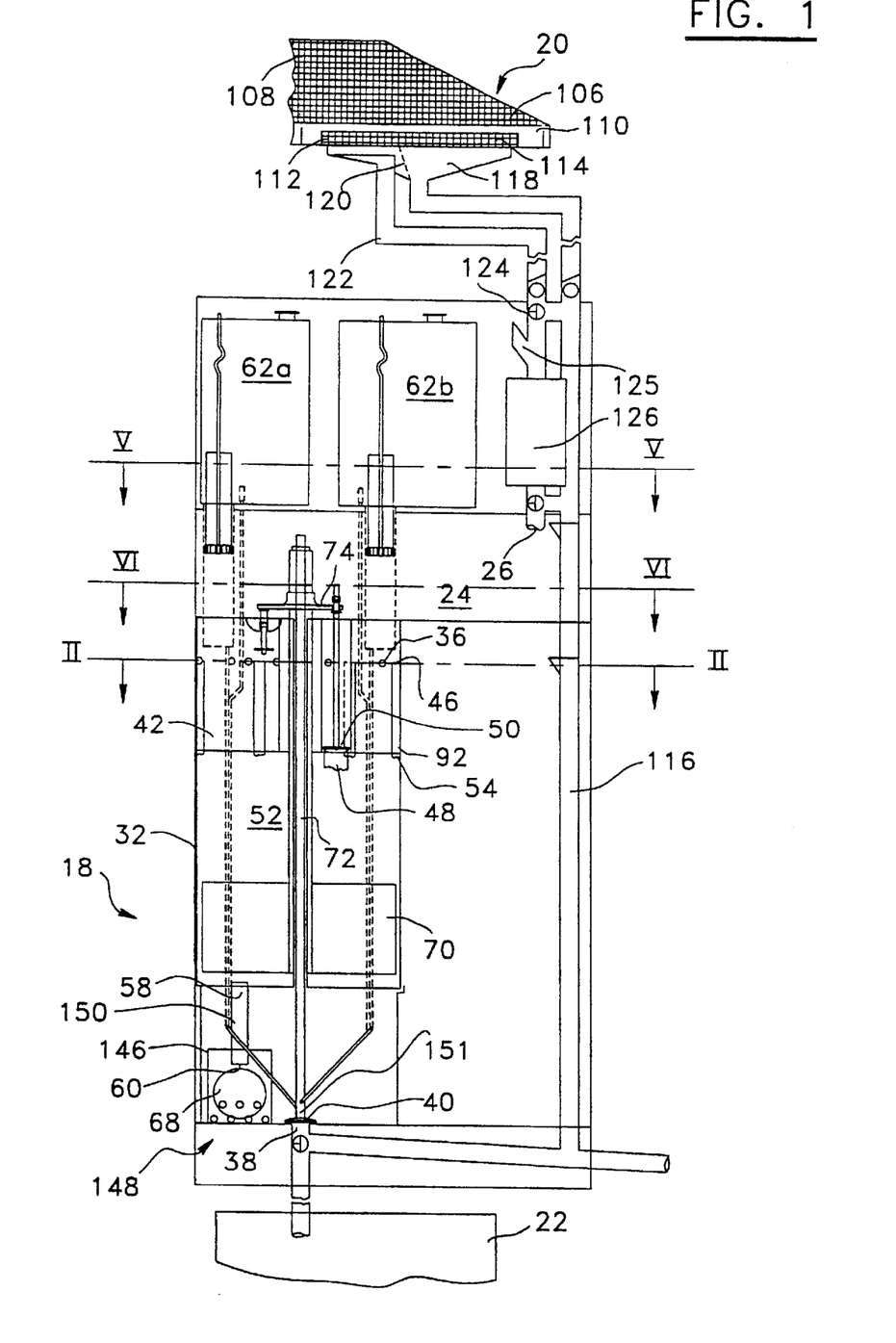
FIG. 1 is a schematic side elevational view of an apparatus according to a first preferred embodiment of the present invention.

The apparatus (18) comprises a stop tank (24) located underneath the water collecting means (20). The stop tank (24) has an inlet (26) for receiving water coming from the water collecting means (20), and a bottom outlet (28) controlled by an outlet valve (30). The term "valve" is herein understood to refer to any device used to regulate the flow of water through an aperture. A simple example of such a device would be a plug to block the water access through an outlet, with means to move this plug in and out of the outlet.

The apparatus also comprises a main tank (32) located underneath the stop tank (24), having an inlet for receiving water from the bottom outlet (28) of the stop tank (24). Water may flow from the main tank (32) through one of two outlets: an upper outlet embodied by holes (36) located in its upper portion, and a bottom outlet (38) controlled by an outlet valve (40) for emptying the main tank (32) into the storage tank (22).

Upper and lower reservoirs (42,52) are provided in the apparatus (18), and are preferably located inside the main tank (32). The upper reservoir (42) has an inlet also embodied by holes (36) for receiving water from the upper outlet of the main tank, an upper outlet (46) located in its upper portion and a bottom outlet (48) controlled by an outlet valve (50) for emptying it. Both the upper outlet (46) and the bottom outlet (48) lead to the lower reservoir (52), which is located underneath the upper reservoir (42) and has a first inlet (54) for receiving water from the upper outlet (46) of the upper reservoir (42), and a second inlet which is also the bottom outlet (48) for receiving water from the upper reservoir (42). The lower reservoir (52) also has a bottom outlet (58) for emptying it into a lower portion of the main tank (32).

To allow the water flowing throughout the apparatus (18) to be treated, at least one solution reservoir (62) containing a water treating solution is provided. Preferably, two such reservoirs (62a, 62b) are provided, respectively containing a chloride solution and a mineral solution. Each solution reservoir (62) has an outlet valve (66) shown in FIGS. 7 and 8. This outlet valve is momentarily open during the treatment cycle to supply a predetermined amount of water treating solution into the main tank (32).

The bottom outlet (58) of the lower reservoir (52) is controlled by a first buoyant element (68), located in the lower portion of the main tank (32). This first buoyant element (68) is movable along a vertical course between lower and higher positions within the main tank (32), depending upon a volume of water therein. The bottom outlet (58) of the lower reservoir (52) is blocked by the first buoyant element (68) when it is in its upper position. Preferably, the first buoyant element (68) is a ball whose horizontal motion is restricted by an enclosure (146). Water holes (148) are provided in the enclosure (146), so the ball rises and falls with the water level in the main tank (32). In the preferred embodiment shown in FIG. 1, an outlet conduit (150) extends between the bottom outlet (58) of the lower reservoir (52) so that when the ball is in its highest position in the enclosure (146), it blocks the lower exit (60) of the outlet conduit (150) and prevents water from exiting the lower reservoir (52).

A second buoyant element (70) is located in the lower reservoir (52), and is movable along a vertical course between lower and higher positions within the lower reservoir (52) depending upon a volume of water therein. This movement of the second buoyant element (70) controls respectively the outlet valves (40, 50, 30, 66) of the main tank (32), the upper reservoir (42), the stop tank (24) and the solution reservoir (62). Preferably, linking means are provided to operationally link the second buoyant element to these outlet valves, and comprise a main shaft (72) vertically translatable in the main tank (32).

In accordance with the present invention, at the beginning of the treatment cycle the first buoyant element (68) is in its lower position, thereby setting the outlet valve (60) of the lower reservoir (52) in an open position. The second buoyant element (70) is also in its lower position to set the outlet valves (40, 50, 66) of the main tank (32), the upper reservoir (42) and the solution reservoir (62) in closed positions and set the outlet valve (30) of the stop tank (24) in open position. Water is thus allowed to flow from the stop tank (24) into the main tank (32), filling the main tank (32) so that the first buoyant element (68) moves to its upper position to close the bottom outlet (58) of the lower reservoir (52).

The water level in the main tank (32) increases until it reaches the upper part of the main tank (32), where it then flows from the upper outlet (36) of the main tank (32) into the upper reservoir (42). The water level in the upper reservoir (42) then increases until it reaches the upper outlet (46) of the upper reservoir (42), and then flows therefrom into the lower reservoir (52).

As the water level in the lower reservoir (52) increases, the second buoyant element (70), first, starts an upward movement toward its higher position to open the outlet valve (40) of the main tank (32) thus allowing flow of water from the main tank (32) into the storage tank (22), to open the outlet valve (50) of the upper reservoir (42) thus allowing a complete filling of the lower reservoir (52), and to close the outlet valve (30) of the stop tank (24) thus stopping flow of water from the stop tank (24) into the main tank (32), and, second, reaches its higher position as the lower reservoir (52) is completely filled. As water flows from the main tank (32) into the storage tank (22) and water level in the main tank (32) goes down to a certain level, the first buoyant element (68) moves downwardly toward its lower position to open the bottom outlet (58) of the lower reservoir (52) thus allowing flow of water from the lower reservoir (52) into the main tank (32) so that the second buoyant element (70) starts a downward movement toward its lower position. A new treatment cycle then begins when the second buoyant element (70) reaches its lower position.

Referring to FIG. 1, there is shown a first preferred embodiment of an appropriate water collecting means (20). It comprises a sloping surface (106), for example the side of a roof top, which acts as a collecting surface for the rain water as it falls. The sloping surface (106) is provided with a first filter (108), preferably a wire grating allowing a first rough filtering of the water by retaining coarse particles such as leaves or the like. Water flows down the sloping surface (106) through the first wire grating (108) to a drain pipe (110). A second filter (112) is provided in the drain pipe (110) which preferably comprises a wire grating (114) similar to the first filter (108), filled with sand of appropriate grain size. The filtered water then flows down from the drainpipe (110) to a settling tank (118). The settling tank (118) is provided with a third filter (120), which is preferably also a wire grating disposed inside the settling tank (118) in an almost vertical plane and having a finer pitch than the wire gratings of the first and second filters (108,114). The water going through the third wire grating (120) is free of macroscopic particles and flows down access pipe (122). The settling tank (118) is cone-shaped so that heavier particles tend to precipitate and accumulate at the bottom of the settling tank (118). An evacuation conduit (116) is connected to this extremity, allowing excess water to be evacuated if the water flow is too high to be accommodated by the apparatus (18).

Preferably, the access pipe (122) leads to a three-way faucet (124). This faucet could for example be of the Apollo series 70-600/900 (trademark). In normal operation, the water flows through this faucet to a fourth filter (125), for example an in line filter RBX 30 MX (trademark) or similar, and then through a Granulate Activated Carbon (G.A.C.) filter (126) before reaching the inlet (26) of the stop tank (24). If the water feed to the main apparatus (18) has to be interrupted, it is possible to manually set the three-way faucet (124) to deviate the incoming water to the evacuation conduit (116). This may be useful for example during a prolonged absence of the user of the apparatus (18).

Figure 3:
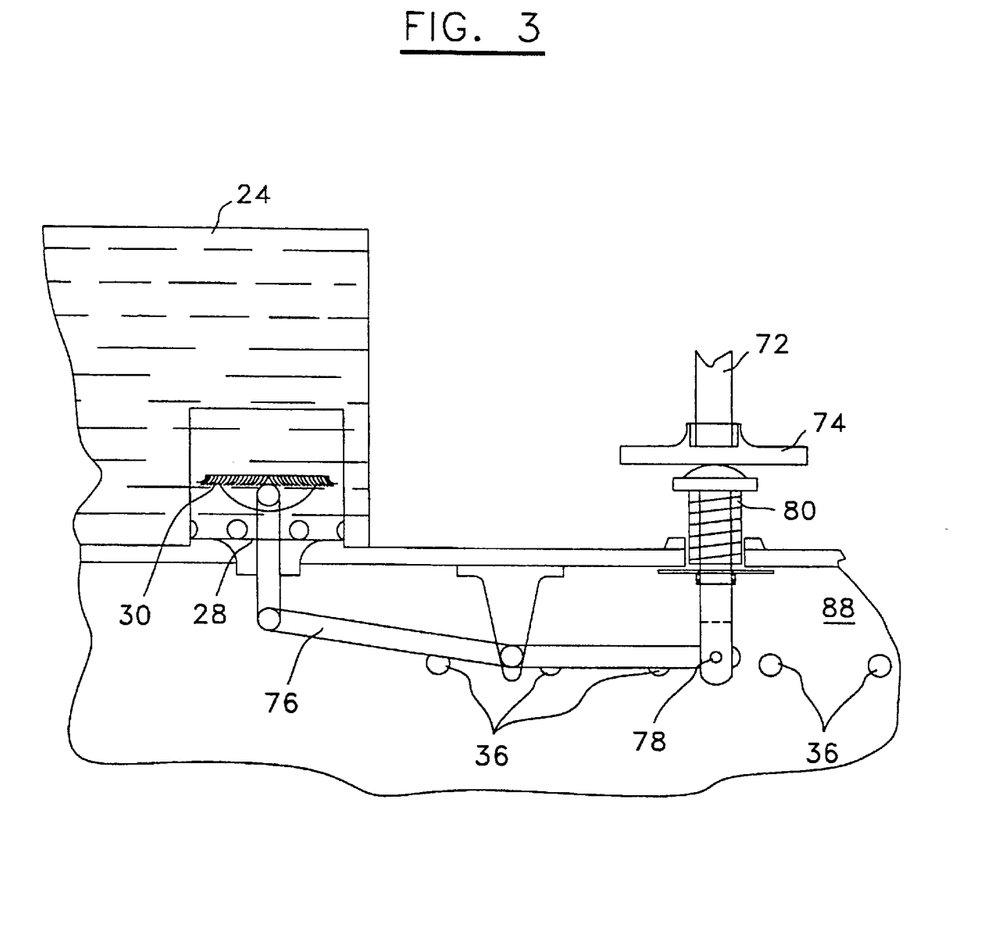
FIG. 3 is a partial side view of a detail of the embodiment of FIG. 1.
Figure 4:
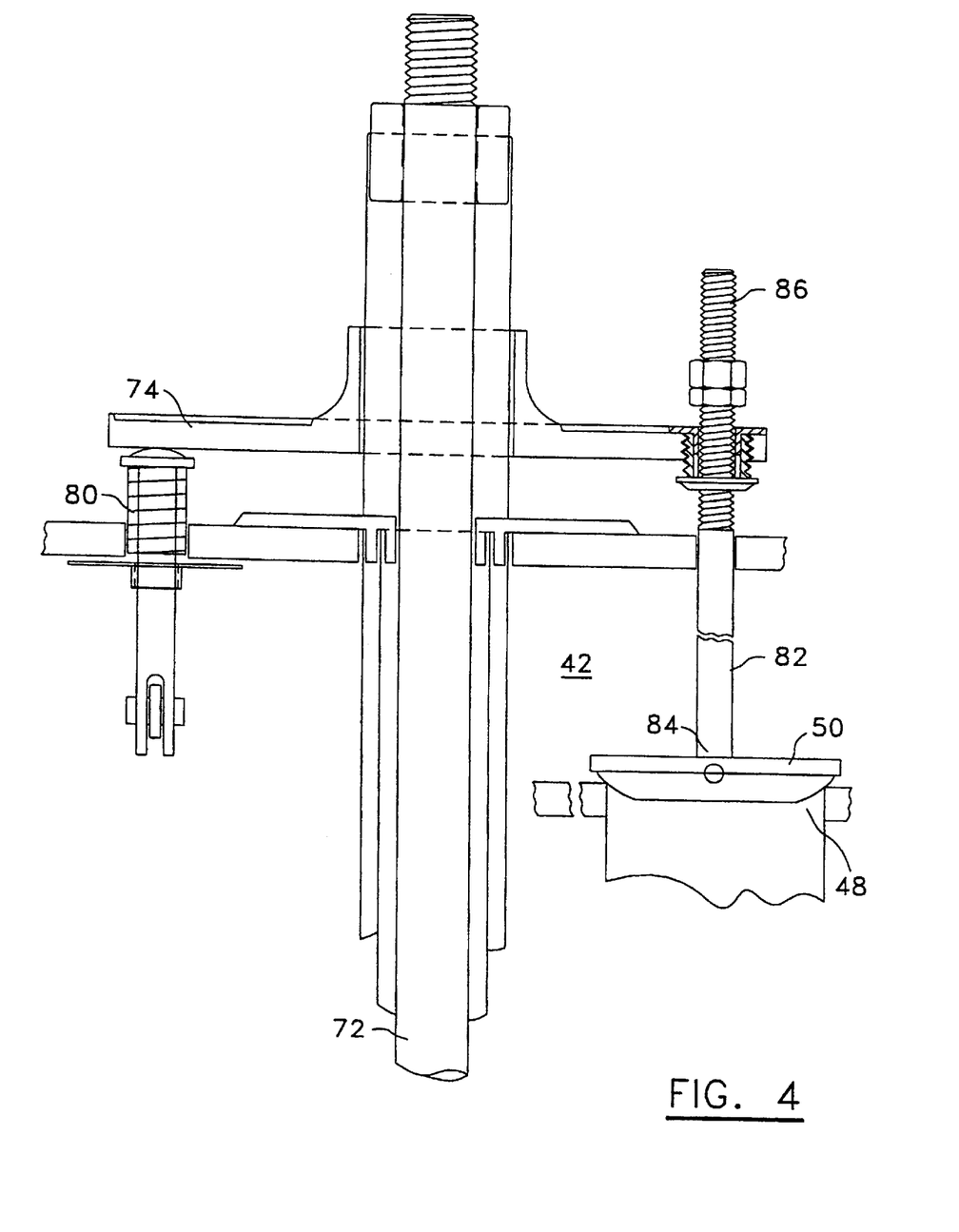
FIG. 4 is a partial side view of another detail of the embodiment of FIG. 1.
Figure 9:
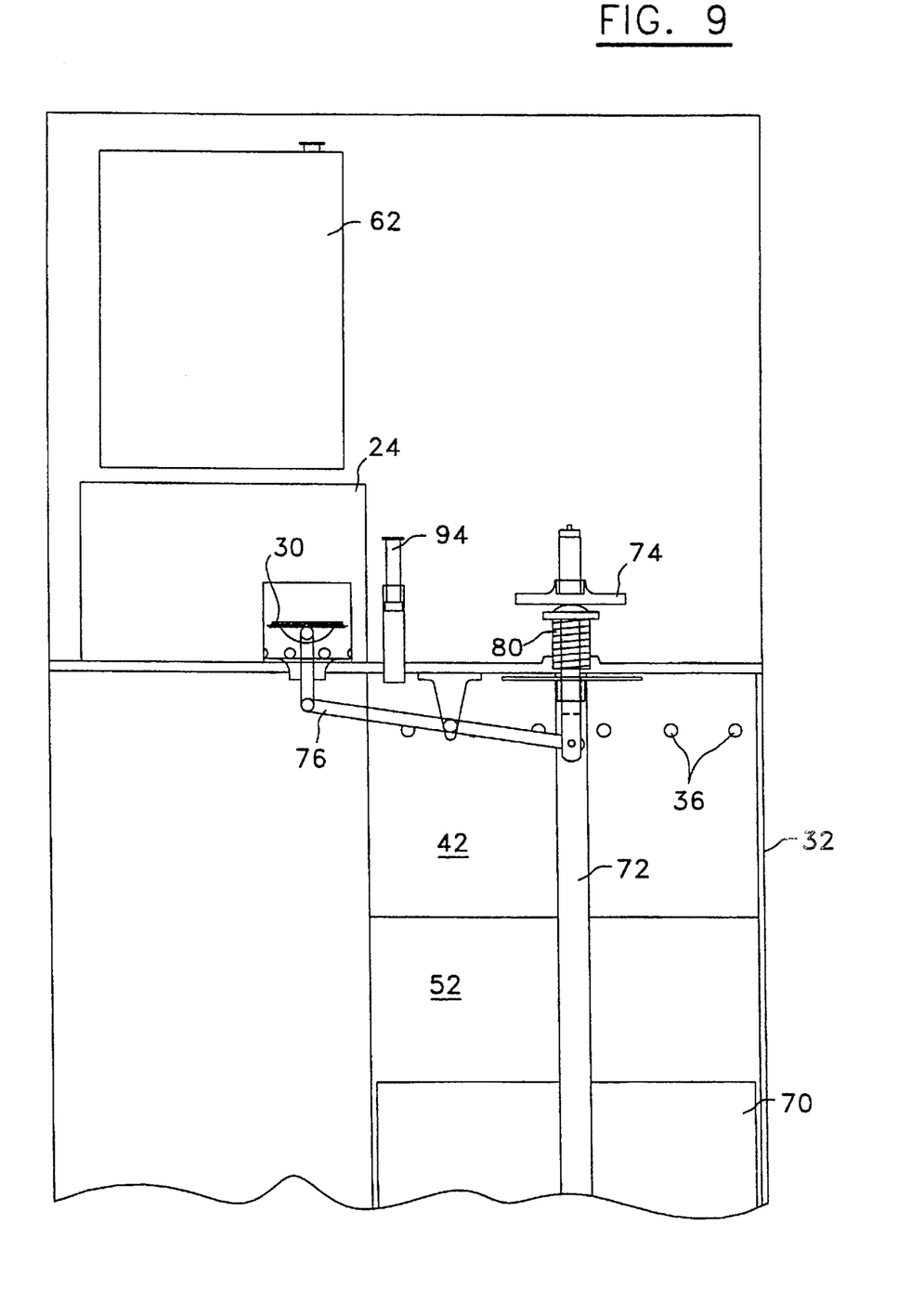
FIG. 9 is a partial side elevational view of an upper part of the embodiment of FIG. 1.

Referring now to FIGS. 3, 4 and 9, the elements of the apparatus 18 mentioned above will be described in more details hereinafter. According to a preferred embodiment of the present invention, the linking means comprises a flange (74) extending orthogonally to the main shaft (72) and fixed to an upper portion thereof. The flange (74) is for operationally linking the second buoyant element (70) shown in FIG. 1 to the outlet valves (30, 50) of the stop tank (24) and the upper reservoir (42) shown in FIG. 1.

The manner in which the flange (74) is linked to the outlet valve (30) of the stop tank (24) is best seen in FIG. 3. The linking means comprises lever means (76) connected to the outlet valve (30) of the stop tank (24), and include an end (78) having upper and lower positions. When the end (78) of the lever means (76) is in its upper position the outlet valve (30) of the stop tank (24) is closed, and when the end (78) is in its lower position the same outlet valve (30) is open. Biasing means such as a spring (80) are further provided as part of the linking means, for biasing the end (78) of the lever means (76) in its upper position. In this manner, when the second buoyant element (70) shown in FIG. 1 moves downwardly toward its lower position, the second buoyant element (70) opens the outlet valve (30) of the stop tank (24) by applying a downward pressure onto the spring (80) via the flange (74).

As may be seen from FIG. 4, in the preferred embodiment of the invention the linking means further comprises an upper reservoir shaft (82), which allows to link the flange (74) to the outlet valve (50) of the upper reservoir (42). The upper reservoir shaft (82) has upper and lower extremities (84, 86) respectively connected to the flange (74) and the outlet valve (50) of the upper reservoir (42). When the second buoyant element (70) shown in FIG. 1 starts its upward movement from its lower position, the outlet valve (50) of the upper reservoir (42) opens by an upward movement of the upper reservoir shaft (82). When the second buoyant element (70) shown in FIG. 1 reaches its lower position, the outlet valve (50) of the upper reservoir (42) closes by a downward movement of the upper reservoir shaft (82).

Referring now to FIG. 1, there is shown how the linking means allow the second buoyant element (70) to control the outlet valve (40) of the main tank (32). The main shaft (72) preferably has a lower extremity (151) which is rigidly attached to the outlet valve (40). The upward vertical movement of the main shaft (72) then pulls the outlet valve (40) from the bottom outlet (38) of the main tank (32) to open said outlet valve (40).

Referring now to FIGS. 1 and 3, according to a preferred embodiment of the present invention, the upper reservoir (42) comprises a vertical wall (88) provided with an inlet embodied by holes (36). Such holes (36) also embody the upper outlet of the main tank (32). In this manner, water flows freely from the main tank (32) into the upper reservoir (42) when the water in the main tank (32) reaches the level of the holes (36).

Figure 2:
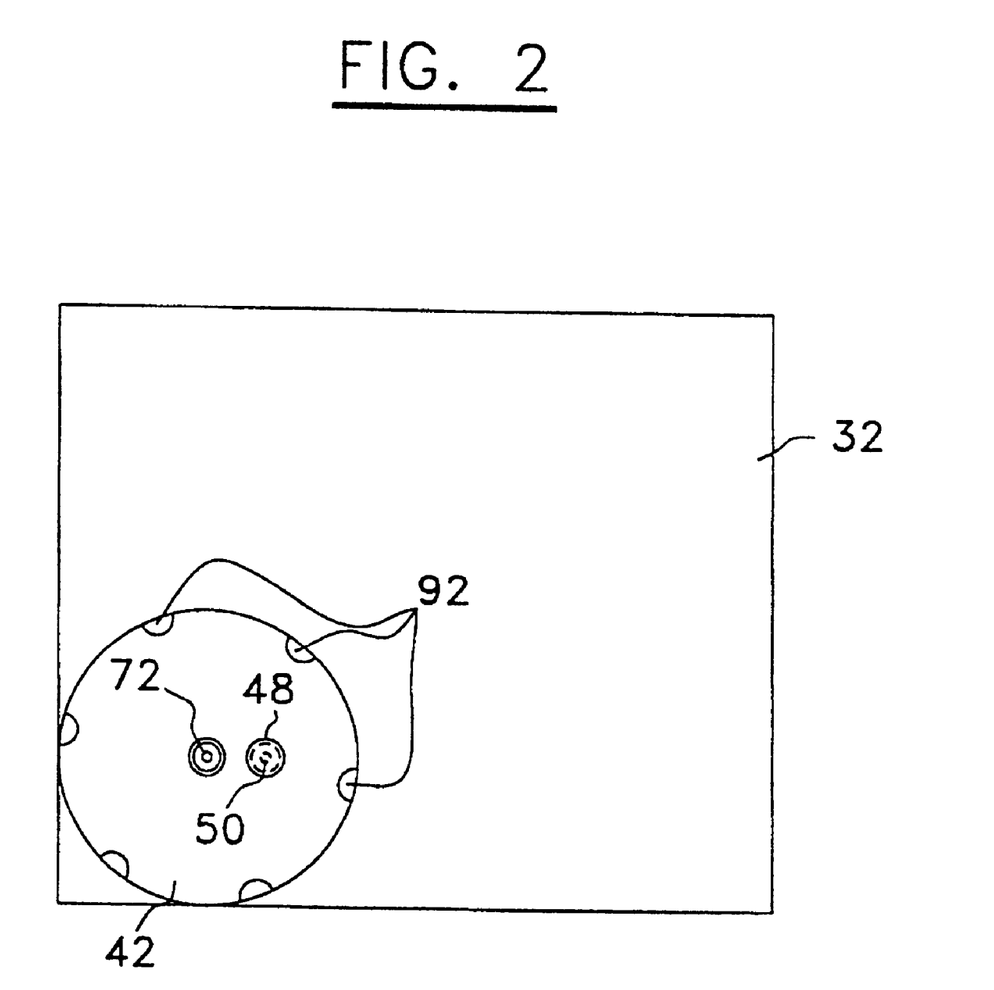
FIG. 2 is a cross-sectional view according to the line II—II of FIG. 1.

Referring now to FIGS. 1 and 2, there is shown, within the upper reservoir (42), that the upper outlet (46) preferably comprises several conduits (92), extending vertically in the upper reservoir (42). These conduits (92) each have an open upper end in the upper portion of the upper reservoir (42) forming its upper outlet (46), and an open lower end forming the first inlet (54) of the lower reservoir (52).

Figure 5:
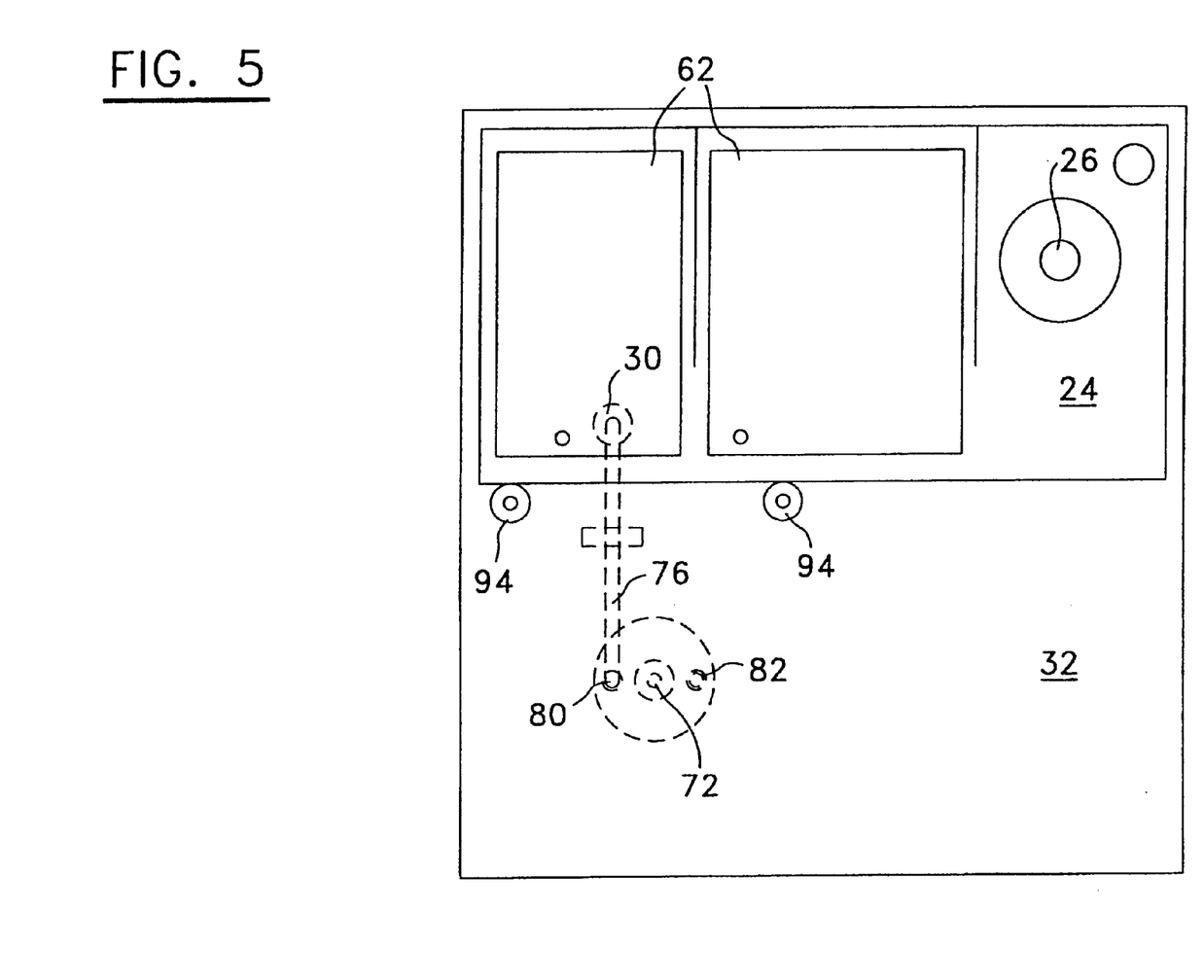
FIG. 5 is a cross-sectional view according to the line V—V of FIG. 1.
Figure 6:
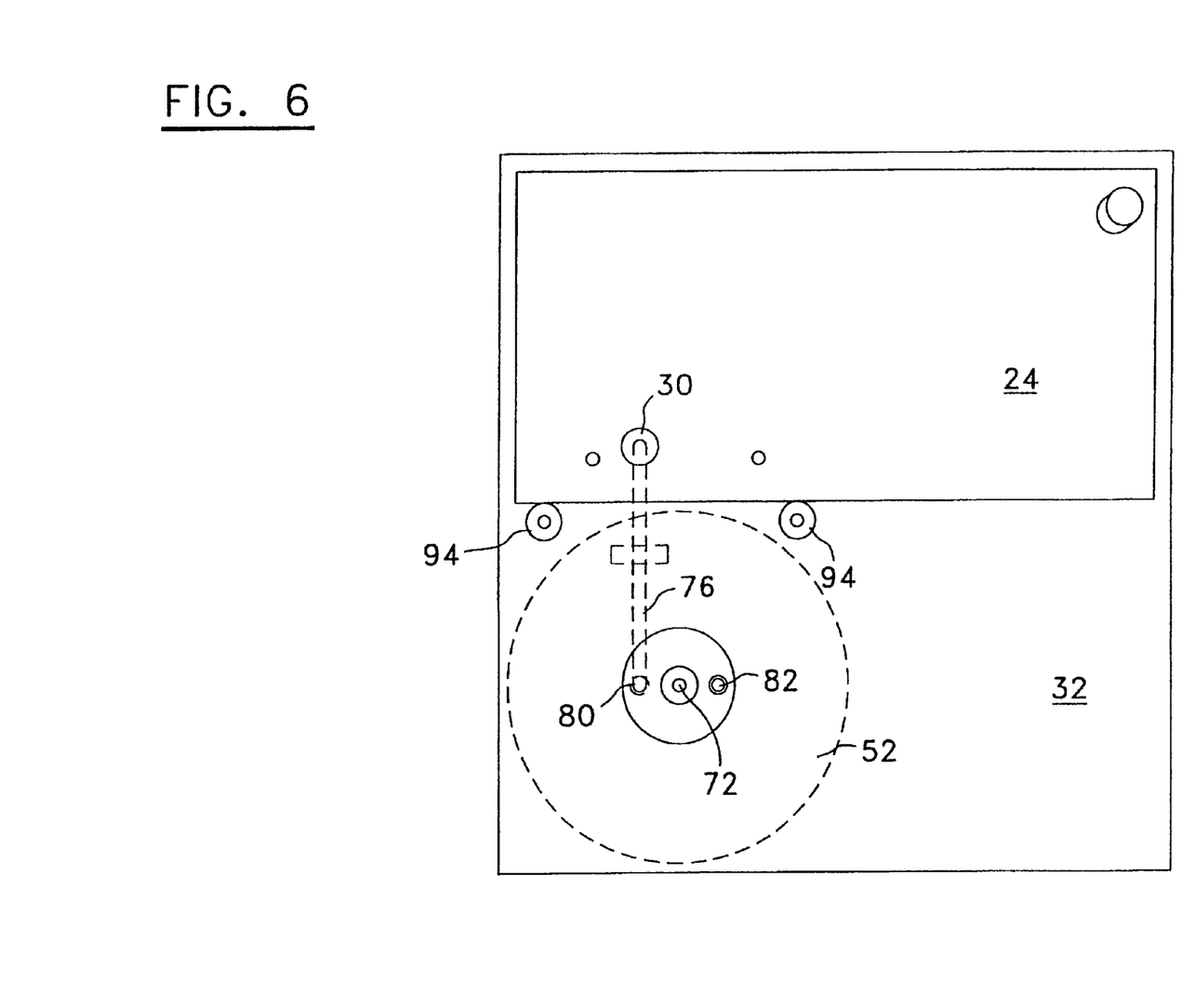
FIG. 6 is a cross-sectional view according to the line VI—VI of FIG. 1.
Figure 7:
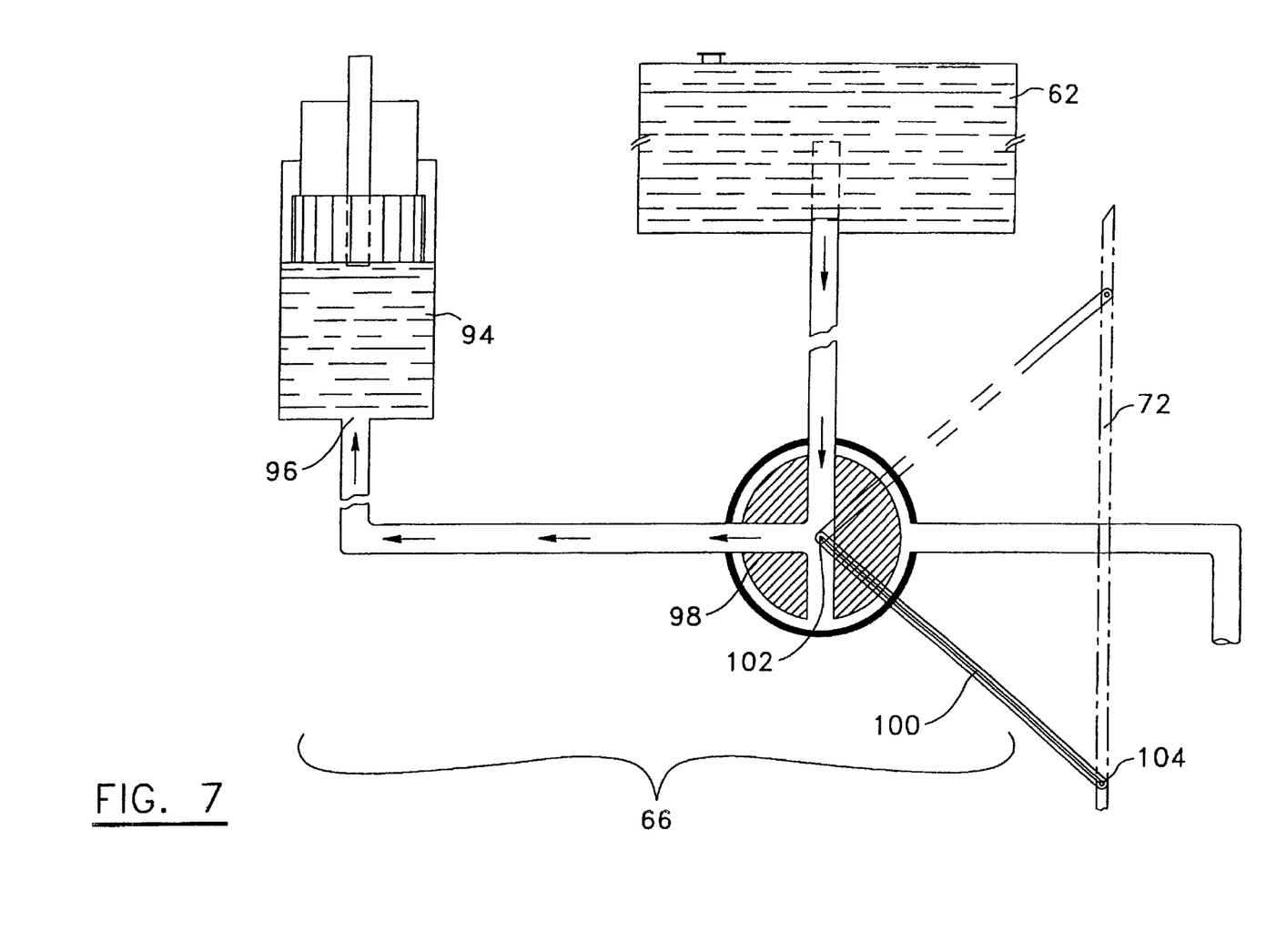
FIG. 7 is a schematic view partially in cross section of another detail of the embodiment of FIG. 1 in a first operating position.
Figure 8:
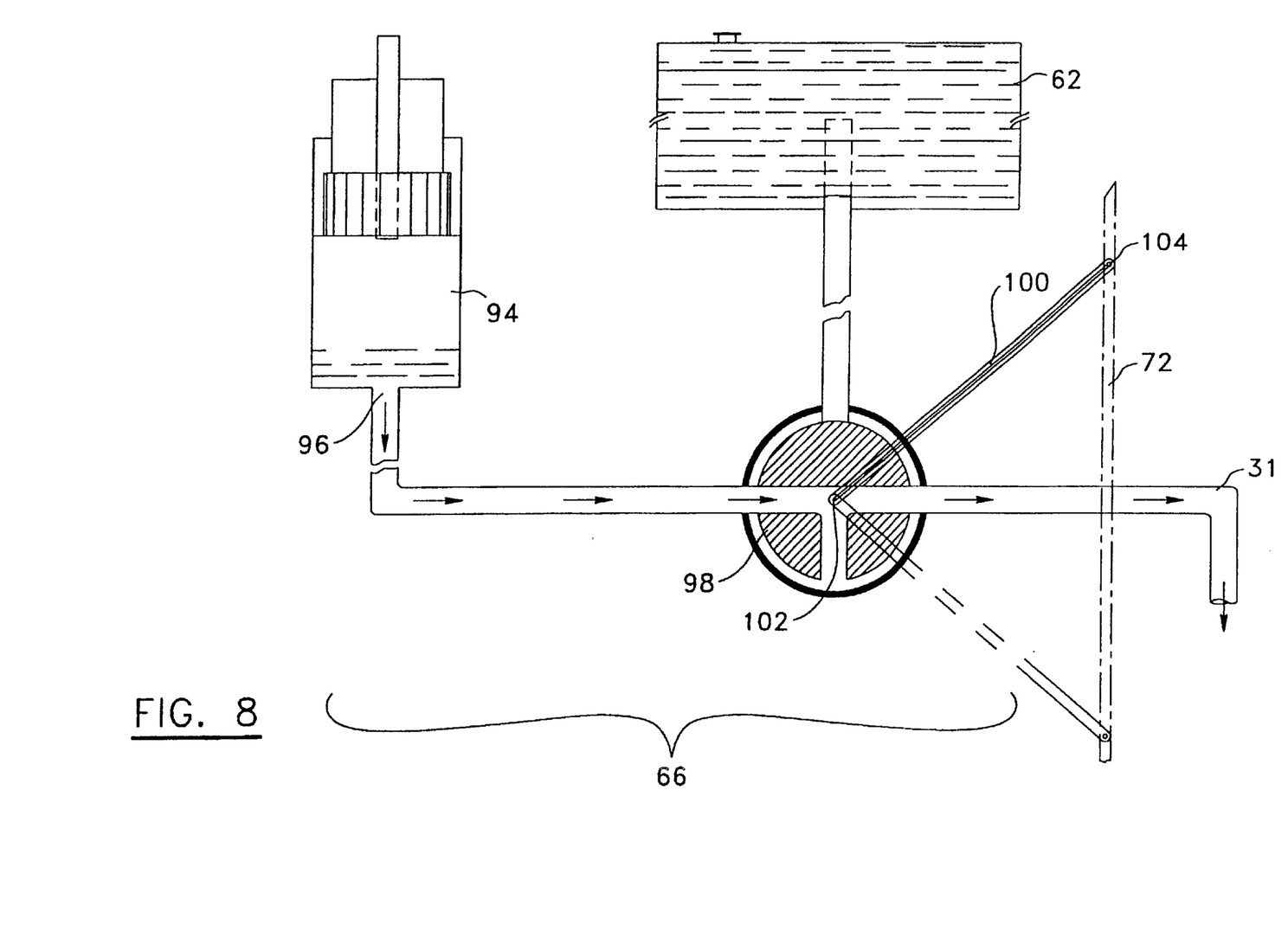
FIG. 8 is a schematic view partially in cross section of the detail shown in FIG. 7 in a second operating position.

Referring now to FIGS. 5, 7 and 8, there are shown the solution reservoirs (62), preferably two in number. Each of the solution reservoirs (62) has an outlet valve (66) controlled by the movement of the second buoyant element (70) shown in FIG. 1. In the preferred embodiment of the present invention, the outlet valve (66) of each solution reservoir (62) comprises a dosing element (94) having an inlet/outlet port (96), for containing a predetermined quantity of water treating solution. The flow of water treating solution from the solution reservoir (62) to the dosing element (94) and then to the main tank via a pipe (31) is controlled by a rotatable faucet (98). This faucet (98) is connected to the solution reservoir (62) and the dosing element (94), and has a first and a second operating positions, respectively shown on FIGS. 7 and 8. The first operating position allows the treating solution to flow from the solution reservoir (62) to the dosing element (94), and the second operating position allows the treating solution to flow from the outlet port (96) of the dosing element (94) to the main tank via the pipe 31. A linkage (100) is further provided, having a first extremity (102) rigidly connected to the rotatable faucet (98) and a second extremity (104) rotatably connected to the main shaft (72). The movement of the second buoyant element (70) shown in FIG. 1 along its vertical course thereby allows to rotate the rotatable faucet (98) between its first and second operating positions.

Figure 10:
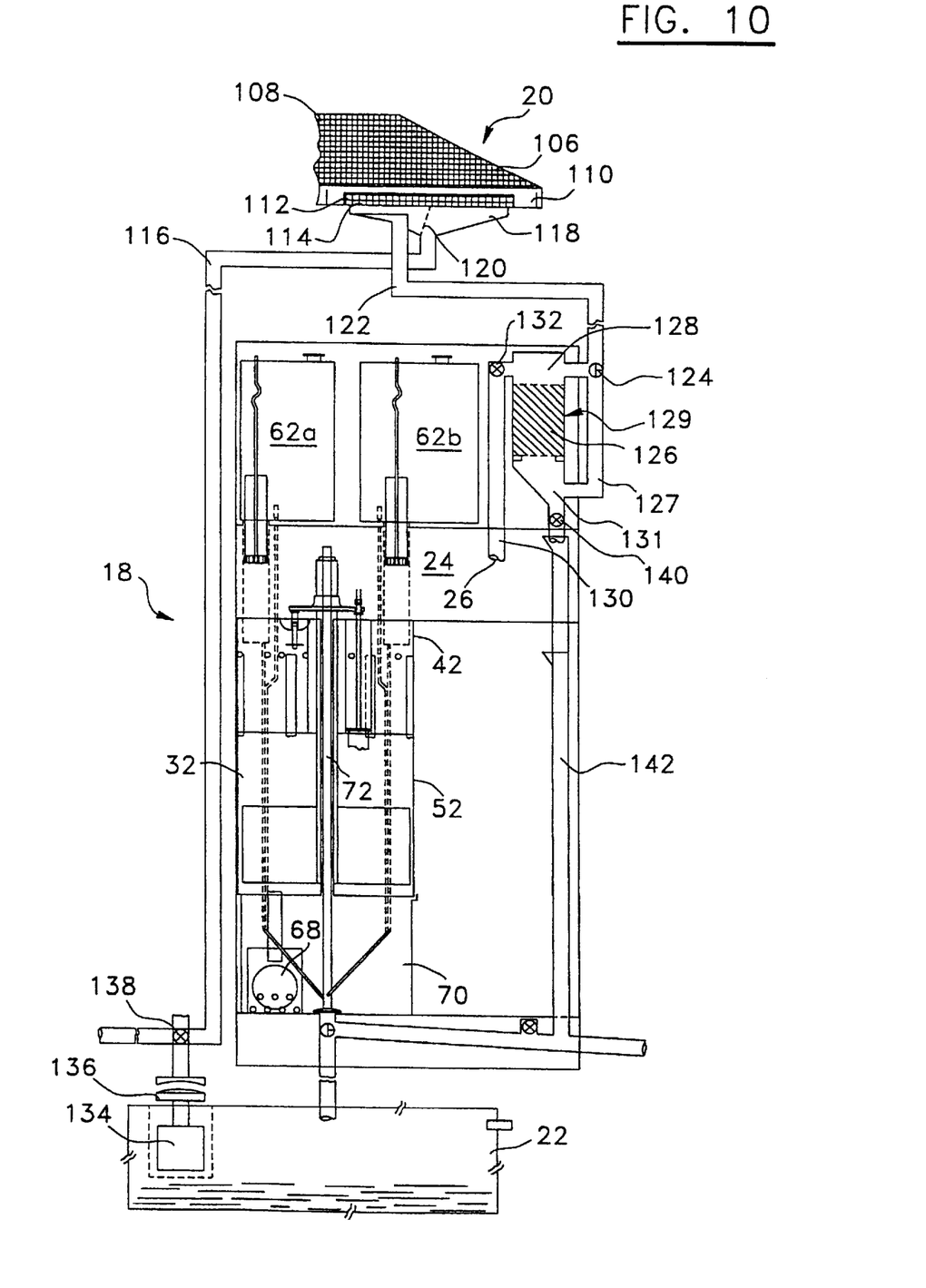
FIG. 10 is a schematic side elevational view of an apparatus according to a second preferred embodiment of the present invention.

Referring now to FIG. 10, there is shown a second preferred embodiment wherein the access pipe (122) is connected to the G.A.C. filter (126) so the water circulates upwardly through said filter (126) in the normal mode of operation. For this purpose, the apparatus (18) further comprises a filter chamber (129) wherein the G.A.C. filter (126) is disposed. The filter chamber (129) has both an upper and a lower portion (128, 131), the upper portion (128) being connected to the lower outlet of the access pipe, and the lower portion (131) to a the lower outlet of a bypass conduit (127). This bypass conduit (127) has an upper inlet connected to the lower outlet of the access pipe (122), and an outlet connected to the lower portion (131) of the filter chamber (129). A water-feeding conduit (130) is also provided, having an inlet connected to the upper portion (128) of the filter chamber (129) and an outlet connected to the inlet (26) of the stop tank (24). The inlet of the water-feeding conduit is controlled by a valve (132). Finally, the apparatus (18) comprises an auxiliary evacuation conduit (142) having an inlet connectable to the lower portion (131) of the filter chamber (129). The inlet of the auxiliary evacuation conduit (142) is also provided with a control valve (140).

The three-way faucet (124) is also in this embodiment positioned at the lower outlet of the access pipe (122) and has two possible positions. In the first position, in operation, water flows from the access pipe (122) into the bypass conduit (127), then into the lower portion (131) of the filter chamber (129) and then upwardly through the G.A.C. filter (126). In the second position, in operation, water flows from the access pipe (122) into the upper portion (128) of the filter chamber (129) and then downwardly through the G.A.C. filter (126). In this manner, the collecting means has two operation modes, a normal mode and a filter-cleaning mode. In the normal mode the three-way faucet (124) is in its first position, the valve (140) of the inlet of the auxiliary evacuation conduit (142) is closed and the valve (132) of the inlet of the water-feeding conduit (130) is open so water flows upwardly through the granulated activated carbon filter (126) and into the stop tank (24). In the filter-cleaning operation mode the three-way faucet (124) is in its second position, the valve (140) of the inlet of the auxiliary evacuation conduit (142) is open and the valve (132) of the inlet of the water-feeding conduit (130) is close so water flows downwardly through the granulated activated carbon filter (126) to clean it and is evacuated through the auxiliary evacuation conduit (142). This cleaning operation should be performed periodically, for example every 5 or 6 months, when the water flow through the G.A.C. filter (126) is substantially diminished by obstructing particles in the filter pores. The filter-cleaning operation mode should be initiated every time it is deemed necessary to clean the G.A.C. filter (126), the necessary duration of the cleaning process being generally a few minutes.

The preferred embodiment shown in FIG. 10 also provides means for self-cleaning of the settling tank (118). A third buoyant element (134) is mounted vertically translatable in the storage tank (22), having a pushing member (136) attached on top thereto. The pushing member (136) is operationally linked to a cleaning faucet (138), so that when the storage tank (22) is full, the third buoyant element (134) is in its highest position and the pushing element opens the faucet (138) by pushing it upward. The water and residues from the settling tank (118) are then allowed to exit via the evacuation conduit (116). Therefore, whenever the storage tank (22) is full the water is evacuated without being processed through the apparatus (18), which avoids damaging or overusing the apparatus (18) when the stored water is used sparingly.

Figure 11:
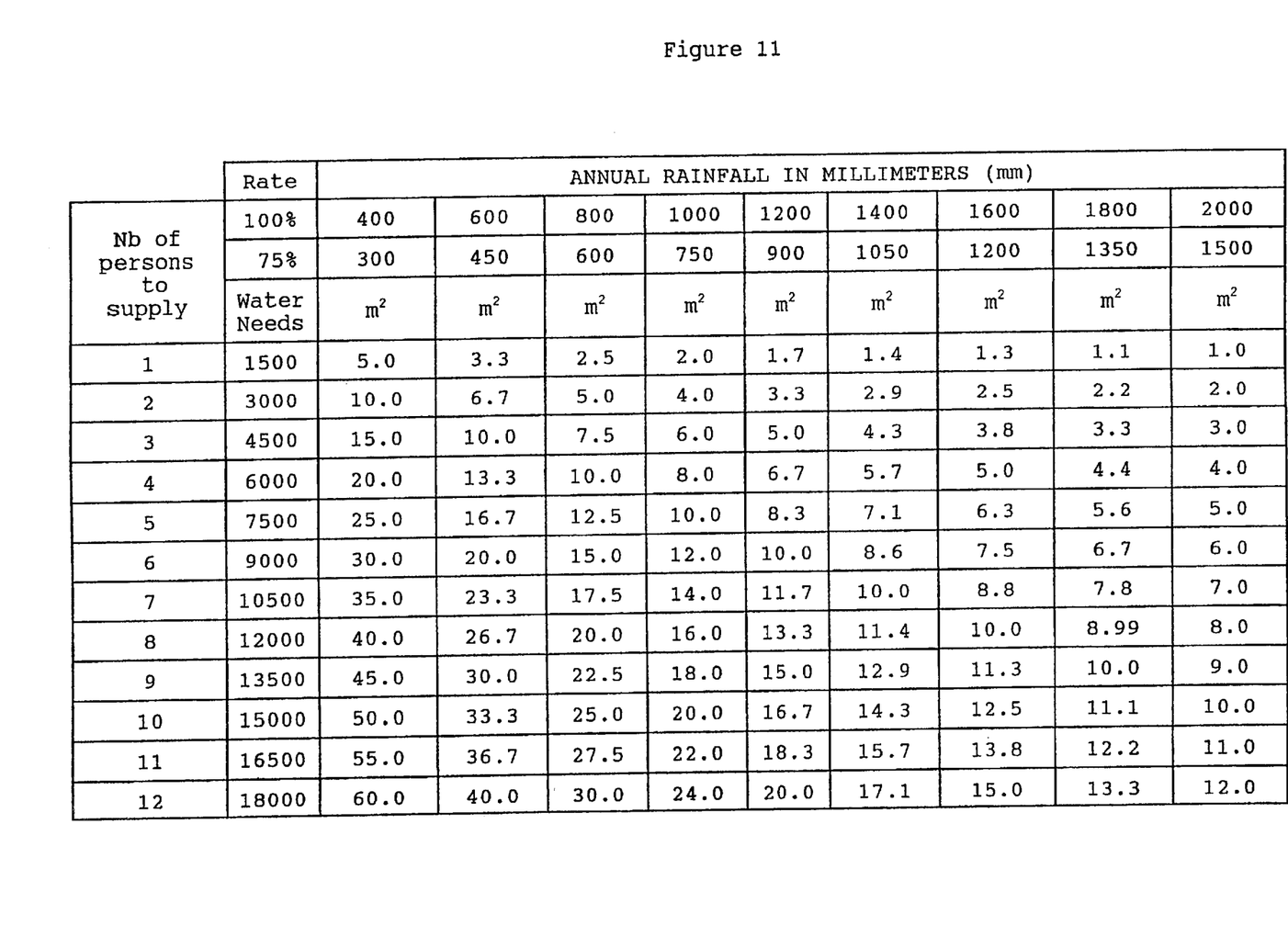
FIG. 11 is a table compiling the minimum area of a water collecting surface for a desired resulting quantity of drinkable water.

The performance of the collecting means (20) described above is directly influenced by the size of the sloping surface (106). The larger the water receiving area is, larger will be the water flow going down the access pipe (122). The minimum surface necessary in this particular embodiment of the invention should be determined by taking into consideration several factors, such as the annual volume of rain water, the amount of water to treat, the material constituting the sloping surface (106) and its resistance to various weather conditions. Referring now to FIG. 11, there is shown a table illustrating the minimum receiving surface necessary as a function of two factors: the number of persons in the household to be supplied, considering one person needs 1500 liter of water a year, and the annual amount of rain water fallen, considering only 75% actually supplies the apparatus, the other 25% being lost in the collecting process.

It is of course understood that the apparatus (18) may be given any size appropriate to the water needs of its users. For example, an apparatus having a capacity of 30 liters per cycle may be appropriate for a typical household, and a larger version accommodating hundreds of liters per cycle may be built to provide drinking water on a commercial basis.

Of course, numerous modifications could be made to the preferred embodiments disclosed hereinabove without departing from the scope of the invention as defined in the appended claims.

What is claimed is:

1. An apparatus (18) for receiving rain water from a water collecting means (20), treating said rain water according to a treatment cycle and supplying treated water into a storage tank (22), characterized in that the apparatus comprises:

a stop tank (24) located underneath the water collecting means (20), having an inlet (hole 26) for receiving water coming from the water collecting means (20), and a bottom outlet (hole 28) controlled by an outlet valve (30);

a main tank (32) located underneath the stop tank (24), having an inlet (hole 28) for receiving water from the bottom outlet (hole 28) of the stop tank (24), an upper outlet (holes 36) located in an upper portion of the main tank (32), and a bottom outlet (hole 38) controlled by an outlet valve (40) for emptying the main tank (32) into the storage tank (22);

an upper reservoir (42) having an inlet (holes 36) for receiving water from the upper outlet of the main tank (holes 36), an upper outlet (46) located in an upper portion of the upper reservoir (42), and a bottom outlet (hole 48) controlled by an outlet valve (50) for emptying the upper reservoir (42);

a lower reservoir (52) located underneath the upper reservoir (42), having a first inlet (54) for receiving water from the upper outlet (46) of the upper reservoir (42), a second inlet (hole 48) for receiving water from the bottom outlet (hole 48) of the upper reservoir (42), and a bottom outlet (58) for emptying the lower reservoir (52) into a lower portion of the main tank (32);

at least one solution reservoir (62) for containing a water treating solution, having an outlet valve (66) for supplying a predetermined amount of water treating solution into the main tank (32), said outlet valve (66) of the solution reservoir (62) being momentarily open during the treatment cycle to supply the predetermined amount of water treating solution into the main tank (32);

a first buoyant element (68) located in the lower portion of the main tank (32) for controlling the bottom outlet (58) of the lower reservoir (52), the first buoyant element (68) being movable along a vertical course between lower and higher positions within the main tank (32) depending upon a volume of water therein, the first buoyant element (68) blocking the bottom outlet (58) of the lower reservoir (52) when said first buoyant element (68) is in its upper position; and a second buoyant element (70) located in the lower reservoir (52) and movable along a vertical course between lower and higher positions within the lower reservoir (52) depending upon a volume of water therein, the second buoyant element (70) being for controlling respectively the outlet valves (40, 50, 30, 66) of the main tank (32), the upper reservoir (42), the stop tank (24) and the solution reservoir (62); at the beginning of the treatment cycle, the first buoyant element (68) being in its lower position to set the bottom outlet (58) of the lower reservoir (52) in an open position and the second buoyant element (70) being also in its lower position to set the outlet valves (40, 50, 66) of the main tank (32), the upper reservoir (42) and the solution reservoir (62) in closed positions and set the outlet valve (30) of the stop tank (24) in open position thus allowing water to flow:

first, from the stop tank (24) into the main tank (32) so that the first buoyant element (68) moves to its upper position to close the bottom outlet (58) of the lower reservoir (52), second, from the upper outlet (36) of the main tank (32) into the upper reservoir (42), and third, from the upper outlet (46) of the upper reservoir (42) into the lower reservoir (52) so that the second buoyant element (70):

first, starts an upward movement toward its higher position to open the outlet valve (40) of the main tank (32) thus allowing flow of water from the main tank (32) into the storage tank (22), to open the outlet valve (50) of the upper reservoir (42) thus allowing a complete filling of the lower reservoir (52), and to close the outlet valve (30) of the stop tank (24) thus stopping flow of water from the stop tank (24) into the main tank (32), and second, reaches its higher position as the lower reservoir (52) is completely filled; as water flows from the main tank (32) into the storage tank (22) and water level in the main tank (32) reaches a certain level, the first buoyant element (68) moves downwardly toward its lower position to open the bottom outlet (58) of the lower reservoir (52) thus allowing flow of water from the lower reservoir (52) into the main tank (32) so that the second buoyant element (70) starts a downward movement toward its lower position, a new treatment cycle beginning when the second buoyant element (70) reaches its lower position.

2. An apparatus (18) as claimed in claim 1, characterized in that:

the upper reservoir (42) and the lower reservoir (52) are located inside the main tank (32); and the second buoyant element (70) is provided with linking means to operationally link the second buoyant element (70) to the outlet valves (40, 50, 30, 66) of the main tank (32), the upper reservoir (42), the stop tank (24), and the solution reservoir (62), the linking means comprising a main shaft (72) vertically translatable in the main tank (32).

3. An apparatus (18) as claimed in claim 2, characterized in that the linking means comprises a flange (74) extending orthogonally to the main shaft (72) and fixed to an upper portion thereof, the flange (74) operationally linking the second buoyant element (70) to the outlet valves (30, 50) of the stop tank (24) and the upper reservoir (42).

4. An apparatus (18) as claimed in claim 3, characterized in that the linking means further comprises:

lever means (76) connected to the outlet valve (30) of the stop tank (24), including an end (78) having upper and lower positions wherein the outlet valve (30) of the stop tank (24) is respectively closed and opened; and biasing means (80) for biasing the end (78) of the lever means (76) in its upper position, so that when the second buoyant element (70) moves downwardly toward its lower position said second buoyant element (70) opens the outlet valve (30) of the stop tank (24) by applying a downward pressure onto the biasing means (80) via the flange (74).

5. An apparatus (18) as claimed in claim 3, characterized in that the linking means further comprises an upper reservoir shaft (82) having upper and lower extremities (86, 84) respectively connected to the flange (74) and the outlet valve (50) of the upper reservoir (42), so that when the second buoyant element (70) starts its upward movement from its lower position the outlet valve (50) of the upper reservoir (42) opens by an upward movement of the upper reservoir shaft (82), and when the second buoyant element (70) reaches its lower position the outlet valve (50) of the upper reservoir (42) closes by a downward movement of the upper reservoir shaft (82).

6. An apparatus (18) as claimed in claim 1, characterized in that the upper reservoir (42) comprises a vertical wall (88), and the inlet (holes 36) of the upper reservoir (42) and the outlet (holes 36) of the main tank (32) comprises a plurality of holes (36) made in the vertical wall (88) of the upper reservoir (42).

7. An apparatus (48) as claimed in claim 1, characterized in that the upper outlet (46) of the upper reservoir (42) comprises at least one conduit (92) extending vertically in the upper reservoir (42), said conduit (92) having an open upper end in the upper portion of the upper reservoir 42 forming the upper outlet (46) of said upper reservoir (42), and a open lower end forming the first inlet (54) of the lower reservoir (52).

8. An apparatus (18) as claimed in claim 1, characterized in that the at least one solution reservoir (62) comprises two solution reservoirs (62a, 62b) respectively containing a chloride solution and a mineral solution.

9. An apparatus (18) as claimed in claim 2, characterized in that the outlet valve (66) of each solution reservoir (62) comprises:

a dosing element (94) having an inlet/outlet port (96), for containing a predetermined quantity of water treating solution;

a rotatable faucet (98) connected to the solution reservoir (62) and the dosing element (94), having a first and a second operating positions, the first operating position of the rotatable faucet (98) allowing the treating solution to flow from the solution reservoir (62) to the dosing element (94), the second operating position of the rotatable faucet (98) allowing the treating solution to flow from the outlet port (96) of the dosing element (94) to the main tank (32); and a linkage (100) having a first extremity (102) rigidly connected to the rotatable faucet (98) and a second extremity (104) rotatably connected to the main shaft (72), so that a movement of the second buoyant element (70) along its vertical course allows the rotatable faucet (98) to rotate between its first and second operating positions.

10. An apparatus (18) as claimed in claim 1, characterized in that the first buoyant element (68) is ball-shaped and the apparatus (18) further comprises an enclosure (146) horizontally restricting the first buoyant element (68) so that the first buoyant element (68) is maintained directly underneath the bottom outlet (58) of the lower reservoir (52), the enclosure (146) having water holes (148) to allow water therein.

11. An apparatus (18) as claimed in claim 1 in combination with the collecting means (20), characterized in that the collecting means (20) comprises:

a collecting surface (106) to collect rain water as it falls down, the collecting surface (106) having a sloped orientation and being provided with a first filter (108) to allow a first filtering of the rain water;

a drain pipe (110) to receive water filtered by the first filter (108) from the collecting surface (106), the drain pipe (110) being provided with a second filter (112) to allow a second filtering of the rain water;

a settling tank (118) connected to an outlet of the drain pipe (110) to receive therefrom water filtered by the second filter (112), the settling tank (118) being provided with a third filter (120) to allow a third filtering of the rain water;

an evacuation conduit (116) to evacuate excess water from the settling tank (118);

an access pipe (122) having an upper inlet connected to the settling tank (118) to receive therefrom water filtered by the third filter (120);

a fourth filter (125) having an inlet connected to an outlet of the access pipe (122) and an outlet, the fourth filter (125) allowing a fourth filtering of the rain water; and a granulated activated carbon filter (126) having an inlet connected to the outlet of the fourth filter (125) and an outlet connected to the inlet (26) of the stop tank (24), the granulated activated carbon filter (126) allowing a fifth filtering of the rain water.

12. An apparatus (18) for receiving and treating rain water and supplying treated water, in combination with the collecting means (20) as claimed in claim 11, characterized in that the collecting means (20) further comprises a three-way faucet (124) at an extremity of the access pipe (122), the three-way faucet (124) having a first position wherein, in operation, water flows from the access pipe (122) into the fourth filter (125), and a second position wherein, in operation, water flows from the access pipe (122) into the evacuation conduit (116).

13. An apparatus (18) as claimed in claim 1 in combination with the collecting means (20), characterized in that the collecting means (20) comprises:

a collecting surface (106) to collect rain water as it falls down, the collecting surface (106) having a sloped orientation and being provided with a first filter (108) to allow a first filtering of the rain water;

a drain pipe (110) to receive water filtered by the first filter (108) from the collecting surface (106), the drain pipe (110) being provided with a second filter (112) to allow a second filtering of the rain water;

a settling tank (118) connected to an outlet of the drain pipe (110) to receive therefrom water filtered by the second filter (112), the settling tank (118) being provided with a third filter (120) to allow a third filtering of the rain water;

an evacuation conduit (116) to evacuate excess water from the settling tank (118);

an access pipe (122) having an upper inlet connected to the settling tank (118) to receive therefrom water filtered by the third filter (120), and a lower outlet;

a filter chamber (129) having an upper portion (128) connected to the lower outlet of the access pipe (122), and a lower portion (131);

a granulated activated carbon filter (126) positioned in the filter chamber (129), the granulated activated carbon filter (126) allowing a fourth filtering of the rain water;

a bypass conduit (127) having an upper inlet connected to the lower outlet of the access pipe (122) and a lower outlet connected to the lower portion (131) of the filter chamber (129);

a water-feeding conduit (130) having an inlet connected to the upper portion (128) of the filter chamber (129) and an outlet connected to the inlet (26) of the stop tank (24), the inlet of the water-feeding conduit (130) being controlled by a valve (132);

an auxiliary evacuation conduit (142) having an inlet connectable to the lower portion (131) of the filter chamber (129), the inlet of the auxiliary evacuation conduit (142) being provided with a control valve (140); and a three-way faucet (124) positioned at the lower outlet of the access pipe (122), the three-way faucet (124) having a first position wherein, in operation, water flows from the access pipe (122) into the bypass conduit (127), and a second position wherein, in operation, water flows from the access pipe (122) into the upper portion (128) of the filter chamber (129).

14. An apparatus (18) for receiving and treating rain water and supplying treated water, in combination with the collecting means (20) as claimed in claim 13, characterized in that the apparatus (18) further comprises a settling tank (118) self-cleaning mechanism including:

a third buoyant element (134) mounted in the storage tank (22) and vertically translatable therein, the third buoyant element (134) having a high position when the storage tank (22) is full;

a pushing member (136) attached to a top portion of the third buoyant element (134); and a cleaning faucet (138) controlling an outlet of the evacuation conduit (116), the cleaning faucet (138) being operationally linked to the pushing member (136) so that when the storage tank (22) is full, an upward movement of the pushing member (136) results in an opening of the cleaning faucet (138) which allows water to exit the evacuation conduit (116).

* * * * *